US012585598B2

(12) United States Patent
Gentilin

(10) Patent No.: US 12,585,598 B2
(45) Date of Patent: Mar. 24, 2026

(54) STORAGE DEVICE WITH HARDWARE ACCELERATOR

(71) Applicant: SONY INTERACTIVE ENTERTAINMENT LLC, San Mateo, CA (US)

(72) Inventor: John Gentilin, Castro Valley, CA (US)

(73) Assignee: SONY INTERACTIVE ENTERTAINMENT LLC

( * ) Notice: Subject to any disclaimer, the term of this patent is extended or adjusted under 35 U.S.C. 154(b) by 11 days.

(21) Appl. No.: 18/394,412

(22) Filed: Dec. 22, 2023

(65) Prior Publication Data

US 2025/0209016 A1 Jun. 26, 2025

(51) Int. Cl.
G06F 13/16 (2006.01)
G06F 13/12 (2006.01)
G06F 13/40 (2006.01)

(52) U.S. Cl.
CPC ........ G06F 13/1668 (2013.01); G06F 13/128 (2013.01); G06F 13/409 (2013.01)

(58) Field of Classification Search
None
See application file for complete search history.

(56) References Cited

U.S. PATENT DOCUMENTS

| | | | | |
|---|---|---|---|---|
| 8,762,658 | B2 * | 6/2014 | Flynn | ................... H05K 7/1444 711/E12.002 |
| 10,089,801 | B1 * | 10/2018 | Musabeyoglu | ....... G06F 21/335 |

| | | | | |
|---|---|---|---|---|
| 10,204,679 | B2 | 2/2019 | Cernea et al. | |
| 10,223,316 | B2 * | 3/2019 | Mataya | .................. G11C 29/44 |
| 11,600,323 | B2 | 3/2023 | Oh et al. | |
| 2001/0034805 | A1 * | 10/2001 | Usui | ................... G06F 13/4243 710/308 |
| 2010/0082995 | A1 * | 4/2010 | Dees | ..................... G06F 3/0625 713/178 |
| 2010/0115184 | A1 * | 5/2010 | Chang | ..................... G06F 21/64 711/E12.008 |
| 2012/0023073 | A1 * | 1/2012 | Dean | ..................... G06F 16/355 707/693 |
| 2016/0055248 | A1 * | 2/2016 | Goel | ...................... G06F 16/134 707/770 |
| 2016/0378359 | A1 * | 12/2016 | Jang | .................... G06F 12/0246 711/118 |
| 2017/0200252 | A1 * | 7/2017 | Nguyen | ............... G06F 9/3871 |
| 2018/0260136 | A1 * | 9/2018 | Huo | ...................... G06F 3/0659 |
| 2020/0401350 | A1 * | 12/2020 | Kannan | ................. G06F 3/0614 |
| 2021/0026805 | A1 | 1/2021 | Bowman et al. | |
| 2021/0217466 | A1 | 7/2021 | Kim et al. | |
| 2021/0397567 | A1 | 12/2021 | Kang et al. | |

(Continued)

OTHER PUBLICATIONS

International Search Report and Written Opinion dated Nov. 5, 2024 for International Patent Application Number PCT/US24/43590.

(Continued)

*Primary Examiner* — Michael Sun
(74) *Attorney, Agent, or Firm* — Kilpatrick Townsend & Stockton LLP

(57) ABSTRACT

A storage device includes a storage controller, a Flash Memory and a hardware accelerator communicatively coupled. The hardware accelerator is configured to selectively retrieve data stored in the flash memory in response to a request for the data and may perform other operation to accelerate data access for a computer system.

20 Claims, 8 Drawing Sheets

(56)  References Cited

U.S. PATENT DOCUMENTS

| | | |
|---|---|---|
| 2021/0406069 A1 | 12/2021 | Koneru et al. |
| 2022/0058469 A1 | 2/2022 | Schwartz et al. |
| 2022/0358718 A1 | 11/2022 | Krishnamurthy et al. |
| 2023/0185664 A1 | 6/2023 | Chung et al. |
| 2023/0281042 A1 | 9/2023 | Khinvasara |
| 2023/0377226 A1 | 11/2023 | Saharia et al. |

OTHER PUBLICATIONS

Gafni, Oran "Make-A-Scene: Scene-Based Text-to-Image Generation with Human Priors" ArXiv, arXiv:2203.13131 Published: Mar. 24, 2022.

Goodfellow, Ian "Generative Adversarial Networks" ArXiv, arXiv:1406.2661, Published: Jun. 10, 2014, Available at: https://arxiv.org/abs/1406.2661.

Huiwen, Chang "Muse: Text-To-Image Generation via Masked Generative Transformers" ArXiv, arXiv:2301.00704 Published: Jan. 2, 2023, Available at: https://arxiv.org/abs/2301.00704.

Mildenhall, Ben, "NeRF: Representing Scenes as Neural Radiance Fields for View Synthesis" ArXiv, arXiv:2003.08934, Published: Mar. 19, 2020 Available at: https://arxiv.org/abs/2003.08934.

Roie Schwaber-Cohen "What is a Vector Database & How Does it Work? Use Cases + Examples" Pinecone, Accessed Dec. 20, 2023, Available at: https://www.pinecone.io/learn/vector-database/.

Yang, Ling "Diffusion Models: A Comprehensive Survey of Methods and Applications" ArXiv, 2209.00796, Published: Sep. 2, 2022, Available at: https://arxiv.org/abs/2209.00796.

PCT/US2024/043582, "International Search Report and Written Opinion", Jan. 15, 2025, 13 pages.

* cited by examiner

200

202

204

INTERFACE
205

Flash Storage

GPU Accelerator

201

Textures

SOC

206

CPU

207

Index

RAM

208

Assets

203

Storage
Controller

Arrays

STORAGE DEVICE WITH HARDWARE ACCELERATOR

FIELD OF THE DISCLOSURE

Aspects of the present disclosure relate to storage devices specifically aspects of the present disclosure relate to flash storage devices including a hardware accelerator.

BACKGROUND OF THE DISCLOSURE

Solid state storage such as flash storage is quickly becoming the most popular type of digital storage for computer applications. The use of Universal Serial Bus (USB) based flash storage devices, also known as thumb drives, has reached near ubiquitous usage. The USB protocol has been updated to increase transfer speeds allowing a greater range of usage for storage in computer systems. Another protocol, Peripheral Component Interconnect Express (PCIe) is also ubiquitous for high-speed interconnection of devices to a computer system. PCIe provides high transfer speed connections to computer systems and even provides some hot swapping capabilities but has long been used to permanently connect certain types of devices like Graphics Cards and Hard Drives to the computer system. Unlike USB, the PCIe hardware interface uses large edge double sided connectors with pinouts for full size cards as large as 49 pins and with the smallest double-sided connector having 18 pins. USB-C (currently the most recent iteration of the USB protocol) on the other hand uses a 12-pin connector. A new standard for PCI interconnect, M.2, has also recently reached widespread adoption. M.2 provides a smaller form factor 59 pin high speed physical interface for PCIe. Additionally, a new protocol for solid state storage NVM Express (NVMe) has reached widespread adoption. NVMe allows for greater parallelism in communication with solid state storage providing increased transfer speeds. NVMe also allows other capabilities for connected devices such as NVM Express over fabrics (NVMe-OF) which allows the use of transport protocol such as TCP to connect to devices connected to a computer systems NVMe physical interface. These new protocols and standards have paved the way for new capabilities that could be implemented on storage devices which improve the functionality of the attached computer system.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Figure 1:
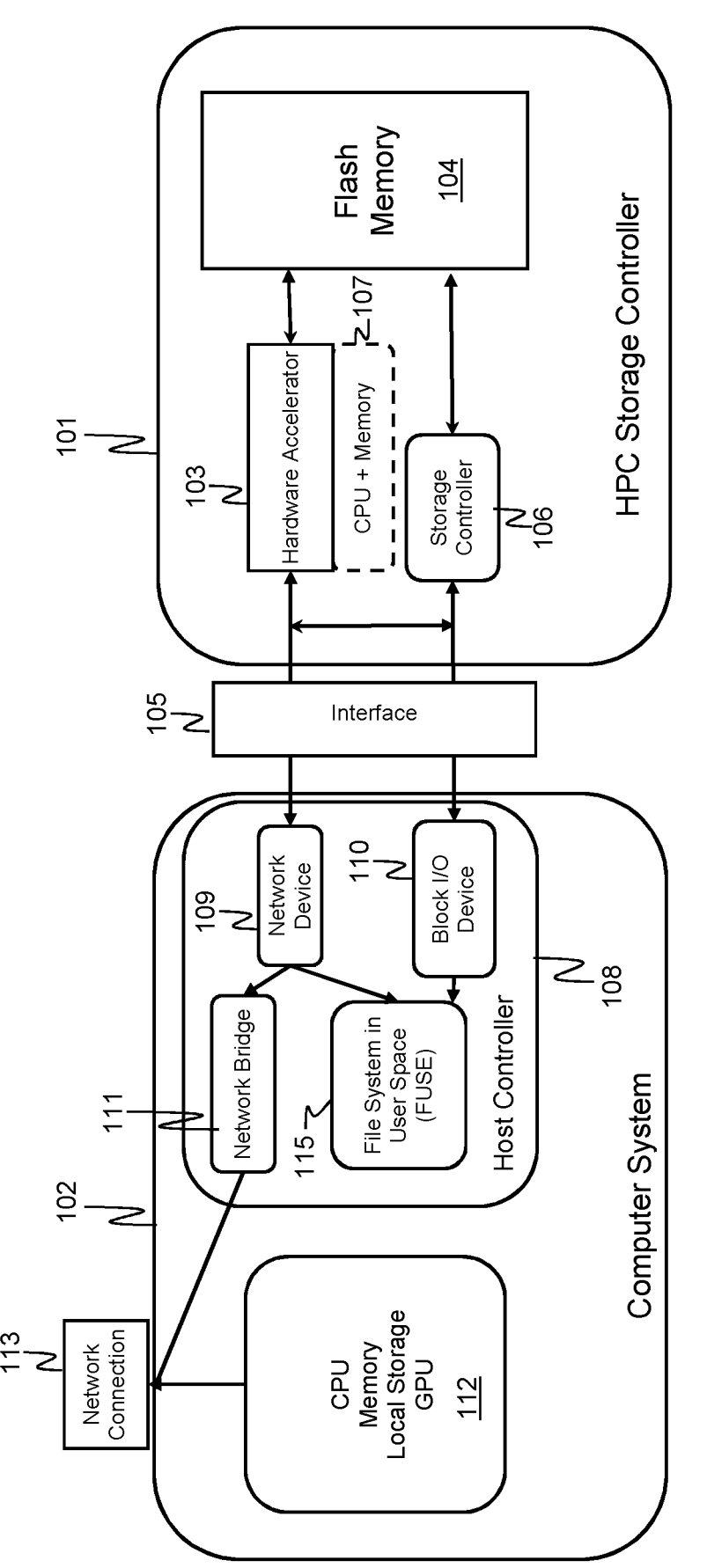
FIG. 1 depicts a block system diagram of a computer system connected to the improved storage device according to aspects of the present disclosure.

According to aspects of the present disclosure a storage device may improve the function of a connected computer system with the addition of a hardware accelerator. FIG. 1 depicts a block system diagram of a computer system 102 connected to the improved storage device according to aspects of the present disclosure. As shown the improved storage device 101 may include a flash memory 104, a storage controller 106 and a hardware accelerator 103. In some optional implementations the storage device may further include a Central Processing Unit (CPU) and, in some implementations, Random Access Memory (RAM) for the CPU 107. The RAM may include a storage device specific operating system (OS). By way of example, and not by way of limitation, in some implementations the hardware accelerator 103, the flash memory 104, and the storage controller 106 may be located on the same circuit board. In alternative implementations, the optional central processing unit and memory 107 may be located on the same circuit board as the storage controller, flash memory and the hardware accelerator.

The improved storage device 101 may communicate with a computer system 102 through a hardware interface 105. The computer system 102 may include a storage device host controller 108. The storage device host controller 108 may include control blocks for the storage device as an I/O device 110 and, optionally, control blocks for the storage device as a network device 109. The I/O device control block 110 may allow the storage device 101 to communicate with the file system 115 of the computer system 102. In some optional implementations the network device control block 109 may communicate with the hardware accelerator 103 in the improved storage device 101. The network device control block 109 may present the improved storage device as a device connected to the computer system over a network connection 113 instead of being connected through a hardware interface 105 and enable communication with the file system of the computer system 115 as an emulated standard network interface. Additionally, the network device control block 109 may allow the improved storage device 101 to communicate over a network connection 113 through a network bridge 111. The network bridge 111 may bridge the connection between the emulated standard network interface in the internal hardware of the computer system and the external network connection 113. Bridging between the network and the improved storage device allows the hardware accelerator to be connected to a network such as the internet using the inbuilt routing of hardware of the computer. This may allow other computers to access the hardware accelerator and/or other components of the improved storage device while protecting the computer system and any separate internal or dedicated network to which it may be connected.

By way of example, in some implementations, routing rules may be configured to allow the accelerator 103 to access a wide area network such as the Internet as well as block access to the dedicated network of the computer system 102. The routing rules may act as the equivalent of a virtual private network (VPN) that isolates traffic from the accelerator 103 to the Internet from internal traffic for the computer system 102. Both the computer system and the accelerator can talk to the Internet, but outgoing traffic cannot access the computer system's separate network. This is an important feature in implementations where it is desirable or even necessary to allow the computer system 102 to provide ingress traffic to the accelerator 103 and let the accelerator to respond to such traffic, but it is also desirable or necessary to prevent the accelerator from monitoring or initiating a connection to the computer system's separate network.

The computer system may include computer hardware components 112 such as a CPU, Memory, Local Storage, or GPU. The computer hardware components 112 may operate together to carry out computer functions and may communicate with the improved storage device during operation. For example and without limitation, the computer hardware components may receive data from improved storage device, send requests for data to the improved storage device, send storage requests to the improved storage device and send data to be stored in the improved storage device. Additionally in some implementations the computer hardware components may operate with the storage device host controller 108 to allow messages from a network connection to reach the improved storage device 101.

An improved feature of the storage device 101 is the hardware accelerator 103. The hardware accelerator 103 may be configured to offload some traditional processes performed by the computer hardware components 112 to the hardware accelerator. The hardware accelerator 103 may include a specialized integrate circuit (IC) such as a Graphics Processing Unit Accelerator (GPU accelerator) IC, a Neural Processing Unit (NPU) IC or a Field Programmable Gate Array (FPGA) IC. For example and without limitation the hardware accelerator 103 may index data from the computer system 102 stored in the flash storage 104 by generating index entries for the data from the computer system that is stored in the flash memory 104 to improve data access times for the computer system and reduce the amount of data that is required to be transferred between the flash memory and the computer system 102. Additionally, the hardware accelerator 103 may perform other functions such as encryption of data, decryption of data, compression of data, decompression of data etc. Compression of data may include corresponding processes of encoding data and decompression of data may include a corresponding process of decoding of the data. Some examples of compression algorithms that may be used by the hardware accelerator include, without limitation, Lempel-Ziv-Welch (LZW), entropy coding algorithms, run length encoding etc. Additionally, the storage device with the hardware accelerator may be able to read the contents of data provided to it by the computer system and choose how to handle the data based on the type of data. The type of data may include file type, arrangement of data, size of data etc. For example and without limitation the improved storage device may store image data using a first index and store audio data using a second index thus reducing search time for both audio and image data. In some alternative implementation the improved storage system may be able to read and search data within data arrays for example and without limitation the improved storage device may be able to search data arrays such as row based data array files or column based data array files for data queries sent by the computer system to the hardware device. An example of a column based array file type that may be used in some implementations of the present disclosure is the Apache Parquet format file type. It should be understood that the arrays may be an implementation of a vector oriented storage. Vector oriented storage may use one or more machine learning models for dimensional reduction and tokenization of the data, the resulting data is referred as an embedding. The embeddings may be stored in the flash memory in an index with reference to the location of the original data. Thus vector oriented databases may be specialized for Single Instruction Multiple Data (SIMD) architecture used in GPUs and some FPGAs and may be more efficient at machine learning tasks. As such in some vector based file types the block sizes of the different sections are of a fixed size, so the hardware accelerator could programmatically determine where to point each core to independently scan data without prior knowledge of the other blocks. In some alternative implementations data in the flash memory may be assets such, videos, images, audio, game scripting, etc. and the hardware accelerator may create derivative assets from base assets stored in the flash memory 104.

Figure 2:
FIG. 2 is a block device diagram depicting an implementation of the improved storage device with a GPU accelerator according to an aspect of the present disclosure.

FIG. 2 is a block device diagram depicting an implementation of an improved storage device with a GPU accelerator according to an aspect of the present disclosure. In this implementation the improved storage device 200 includes a GPU type hardware accelerator 201, Flash memory 202, storage controller 203 and hardware interface 204 which may be communicatively coupled though a main data bus 204. Optionally, the improved storage device may include a CPU 207 which may also be communicatively coupled with Random Access Memory (RAM) 208. The optional CPU and RAM may be integrated together in a single System on Chip (SOC) package. RAM 208 may include instructions for the operation of a storage device specific operating system implemented by CPU 207. The optional CPU 207 may be any suitable CPU Alternatively, instructions for the storage device specific OS may be stored in a portion of the flash memory 202.

The GPU type hardware accelerator 201 hereinafter referred to as a GPU accelerator may perform functions to assist the operation of a computer system's GPU. For example and without limitation, the GPU accelerator 201 may perform data storage using an index and retrieval using the index. In some implementations, the data stored may be texture data indexed by at least a Level of Detail (LOD); the hardware accelerator may be configured to retrieve the correct texture data based on an LOD provided by the computer system. In some implementations the texture data indexed by at least LOD may be MIP Maps stored in the flash memory and the GPU accelerator may retrieve the correct resolution texture based on the request from the computer system. In some implementations, the GPU accelerator may also perform other functions graphics processing functions such as graphics pipeline operations. For example and without limitation, the GPU accelerator may be configured to perform shading and filtering operations on images in the flash memory. According to an aspect of the present disclosure the GPU accelerator may be configured to allow a specialized language similar to OpenGL to operate the hardware accelerator and perform tasks. This may provide software developers the ability to define how to efficiently comb through data located stored in the flash memory. An aspect of some implementations of the present disclosure is that the GPU accelerator may be able see and use the flash memory on the improved storage device in the same way a GPU on the computer can access memory located in the GPU (Sometimes referred to as VRAM). In some other alternative implementations, the GPU accelerator may include a hardware codec and/or may be configured to perform video encoding and decoding. Additionally, the GPU accelerator may be configured to perform data heavy manipulation and filtering. In some implementations the GPU accelerator may be configured implement one or more trained machine learning models. The GPU accelerator along with other components of the storage device may include a flexible open storage language that enables custom data filters to be generated by users and executed with the GPU accelerator. The GPU accelerator may be configured to execute custom filters that manipulate data arrays stored in the flash memory and provide the manipulated data to the computer system thus reducing processing workload for the computer system. The filters executed by the GPU accelerator may multiply, add, subtract, divide, remove, copy, formatting, algorithmic operations, etc. data stored in the flash memory. In some implementations the computer system may request specific data and the GPU accelerator may filter the arrays stored in the flash for the specific data thus reducing the amount of data transferred to the computer system and eliminating the need for the computer system itself to filter the data.

The storage controller 203 may be any suitable storage controller in the art for example and without limitation the storage controller may be an NVMe controller, PCIe controller, a USB controller or similar. Similarly, the hardware interface 205 may be any hardware interface compatible with the storage controller. Suitable hardware interfaces may be for example and without limitation USB connector, M.2 connector, PCIe edge connector, etc. The flash storage may be any suitable solid-state storage.

Figure 3:
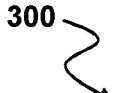
FIG. 3 is a block device diagram depicting an implementation of the improved storage device with an FPGA based accelerator according to an aspect of the present disclosure.
Figure 3:
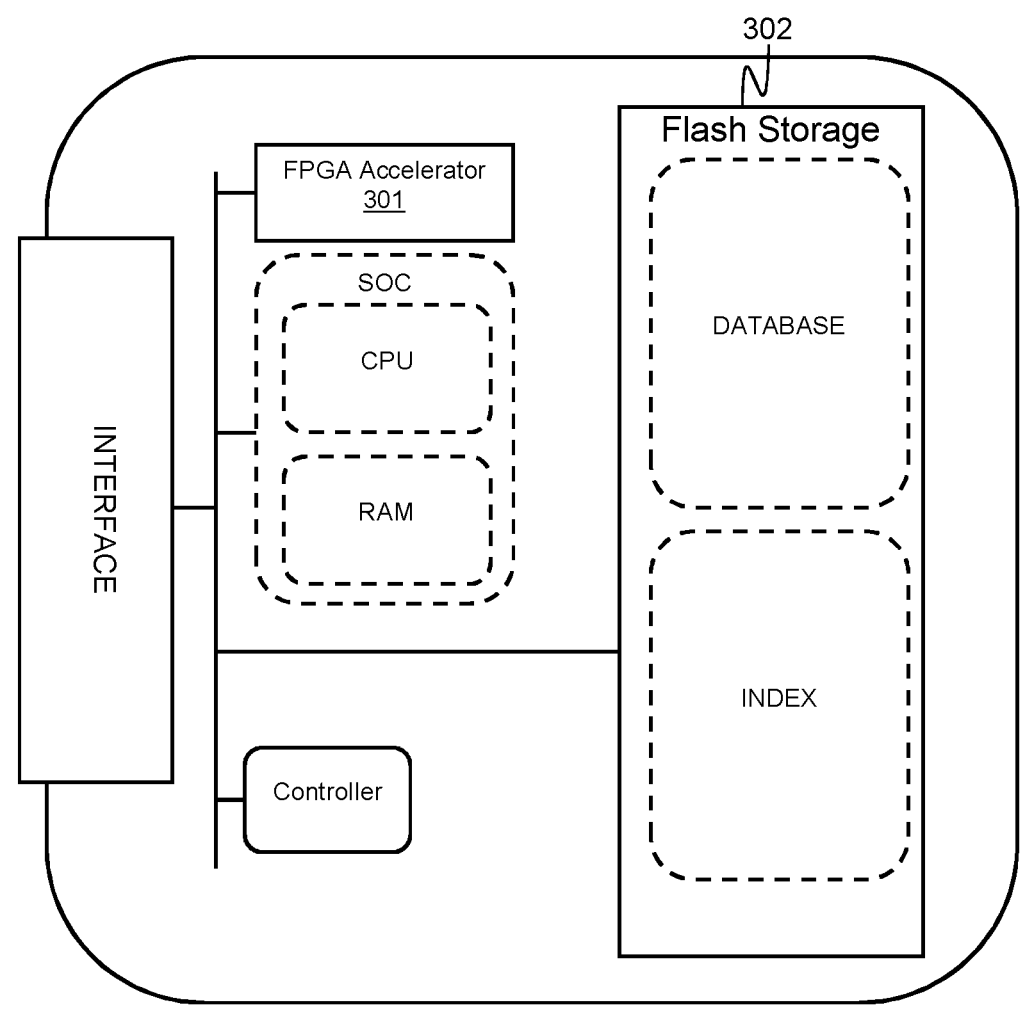

FIG. 3 is a block device diagram depicting an alternative implementation of the improved storage device 300 with an FPGA based accelerator according to an aspect of the present disclosure. The FPGA accelerator 301 may perform similar functions to the GPU type accelerator 201 but may be more specialized for a purpose such as database manipulation. The FPGA based accelerator 301 may be any suitable Field Programmable Gate Array known in the art and in some implementations may be a custom integrated circuit for use in the improved storage device. The FPGA accelerator 301 may perform data storage with the flash memory using and index and retrieval using the index. Index entries may be generated by the FPGA accelerator. Additionally, The FPGA accelerator 301 may be configured to perform data heavy manipulation and filtering on data stored in the flash memory 302. The FPGA accelerator along with other components of the storage device may be loaded with a flexible open storage language that enables custom data filters to be generated by users and executed with the FPGA accelerator. The FPGA accelerator may be configured to execute the custom filters that manipulate data in a database stored in the flash memory 302 and provide the manipulated data to the computer system thus reducing processing workload for the computer system. The data in the database may be arranged in an array such as a row-based array or column based array format. As discussed above the database may be a vector oriented database. The filters executed by the FPGA accelerator may multiply, add, subtract, divide, remove, copy, formatting, algorithmic operations, etc. data stored in the flash memory. In some implementations the computer system may request specific data and the FPGA may filter the arrays stored in the flash for the specific data thus reducing the amount of data transferred to the computer system and eliminating the need for the computer system itself to filter the data. The FPGA may be configured to include a codec implemented in either specialized hardware (also referred to as a HardIP codec) or in software running on more general purpose hardware (referred to as a SoftIP codec) which may perform coding and decoding function such as video encoding, cryptography, hashing etc. In some implementations the FPGA may perform codec function on a combination of SoftIP and HardIP. The FPGA may include SoftIP implementing Video Hardware Description Language (VHDL) blocks and also HardIP blocks like the memory controller or PCIE controller which are much more process operation efficient than the SoftIP because the HardIP is configured in Silicon and does not consume the limited resource of FPGA Logical units (LUT's).

Figure 4:
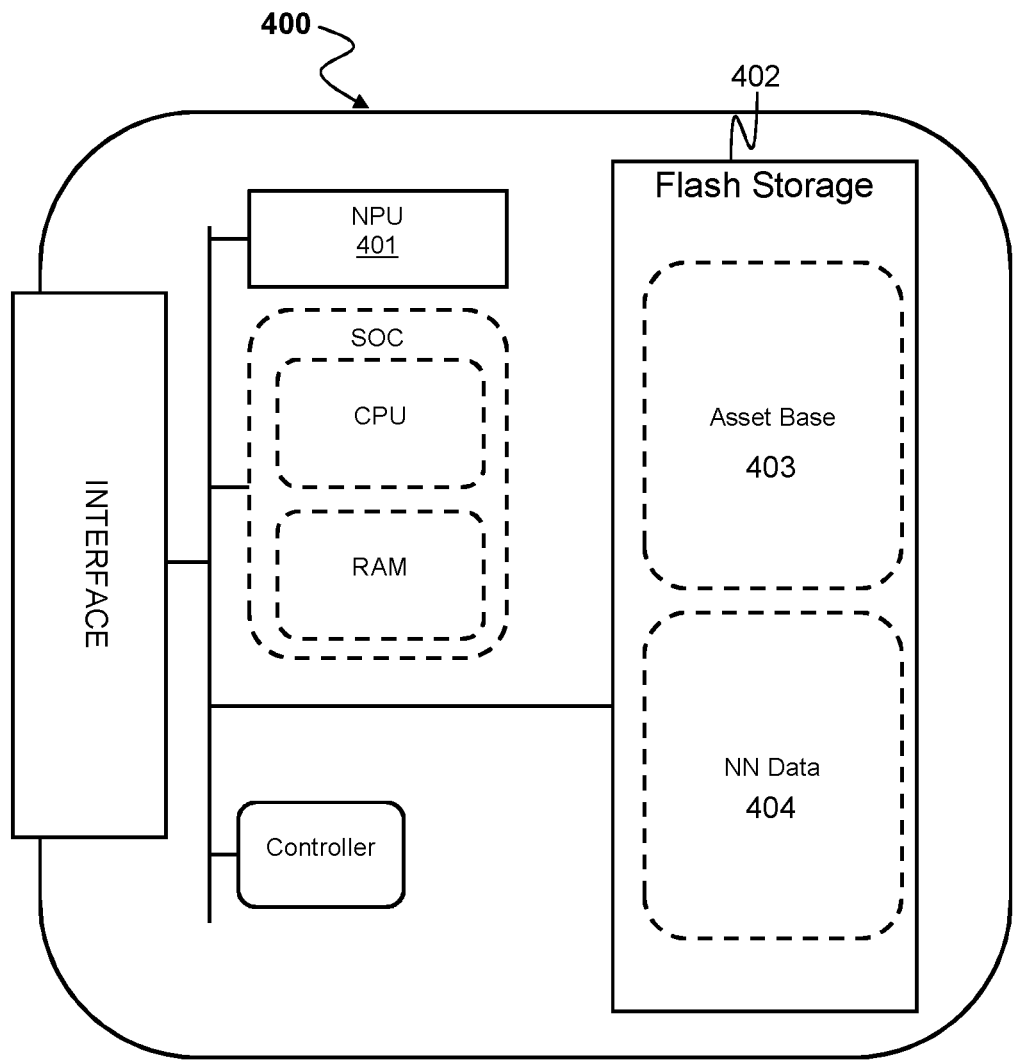
FIG. 4 is a block device diagram depicting an implementation of the improved storage device with a neural processing unit according to an aspect of the present disclosure.

FIG. 4 is a block device diagram depicting an alternative implementation of the improved storage device with a neural processing unit according to an aspect of the present disclosure. In this implementation the storage device includes an NPU 401 communicatively coupled to the flash memory 402. The NPU 401 may be an application specific integrated circuit (ASIC) specialized to carry out machine learning functions. In some implementations the NPU 401 may include a pre-trained neural network model formed in the hardware. In some implementations the NPU 401 may include one or more floating point calculation subunits configured to quickly perform mathematical operations associated with machine learning.

According to an aspect of the present disclosure the NPU 401 may read the flash memory 402 and be configured to generate derivative assets from base assets stored in the flash memory. The NPU 401 may be loaded with Neural Network (NN) data such as an NN model with corresponding weights, transition values and the like. The NN data may cause the NPU to implement a pre-trained neural network model for asset generation for example and without limitation the NPU may implement a generative type pre-trained neural network such as an Auto encoder type models, Diffusion type models, etc. Examples of Auto encoder type models includes transformer type models such as Chat Generative Pre-trained Transformers (GPT), Bidirectional Encoder Representations from Transformers (BeRT), Language Model for Dialogue Applications (LaMDA), etc. In some implementations the NPU may implement other neural networks models. For example and without limitation, the other neural networks models may be Neural Radiance Fields (NeRF) models. Aspects of the present disclosure additionally implement a custom language allowing developers to provide the hardware controller with custom instructions for machine learning models. As such there is no limitation on machine learning models that may be implemented by the improved storage device. Furthermore, aspects of the present disclosure are not limited to generative machine learning models or unsupervised machine learning models and may also apply to other ML models like supervised learning models, wherein the model is trained with developer supervision and trained and frozen, the trained model is then used without further adjustment. For example and without limitation, the improved storage device may enable a developer to write a custom script to represent an inference model and use the hyper-parameters from the training to scan data in the flash memory. The inference action may be in the form of a data request from the computer to the hardware accelerator to use the inference model to "query" the data using the hyper parameters as a filter expression.

The NPU 401 implementing the neural network model may be configured to use base asset data 403 stored in the flash memory to generate one, two, or more derivative assets. For example and without limitation, the derivative asset may be event scripting or character dialog, the neural network model may be a pre-trained generative model (such as a large language model like GPT) trained with a machine learning algorithm to generate event scripting and/or character dialog and the base asset may be a prompt for a generation of a specific event and/or character dialog. When the computer system calls the base asset with a generative command the NPU may generate event scripting or character dialog from the prompt. This may allow the computer system to store a prompt which is only a small amount of data in the flash memory and generate a large amount of data for the scripting and/or character dialog.

In another example the neural network model may be a pre-trained generative model for images and the base asset may be an image, a video, one or more frames from a video, or a text prompt stored in the flash memory.

When the computer system calls the base asset with a generative command the NPU may generate a different derivative image, video, frames from a video or model (depending on the request and the type of machine learning model) from the base asset using a pre-trained machine learning model (such as a diffusion model) trained with a machine learning algorithm. In yet another implementation the NPU may implement a deep learning NN model such as a NeRF model with a machine learning algorithm and the base asset includes two or more image views of a scene or an object. When the computer requests the base asset with a generative command the NPU may generate a three-dimensional representation of the base asset.

Figure 5:
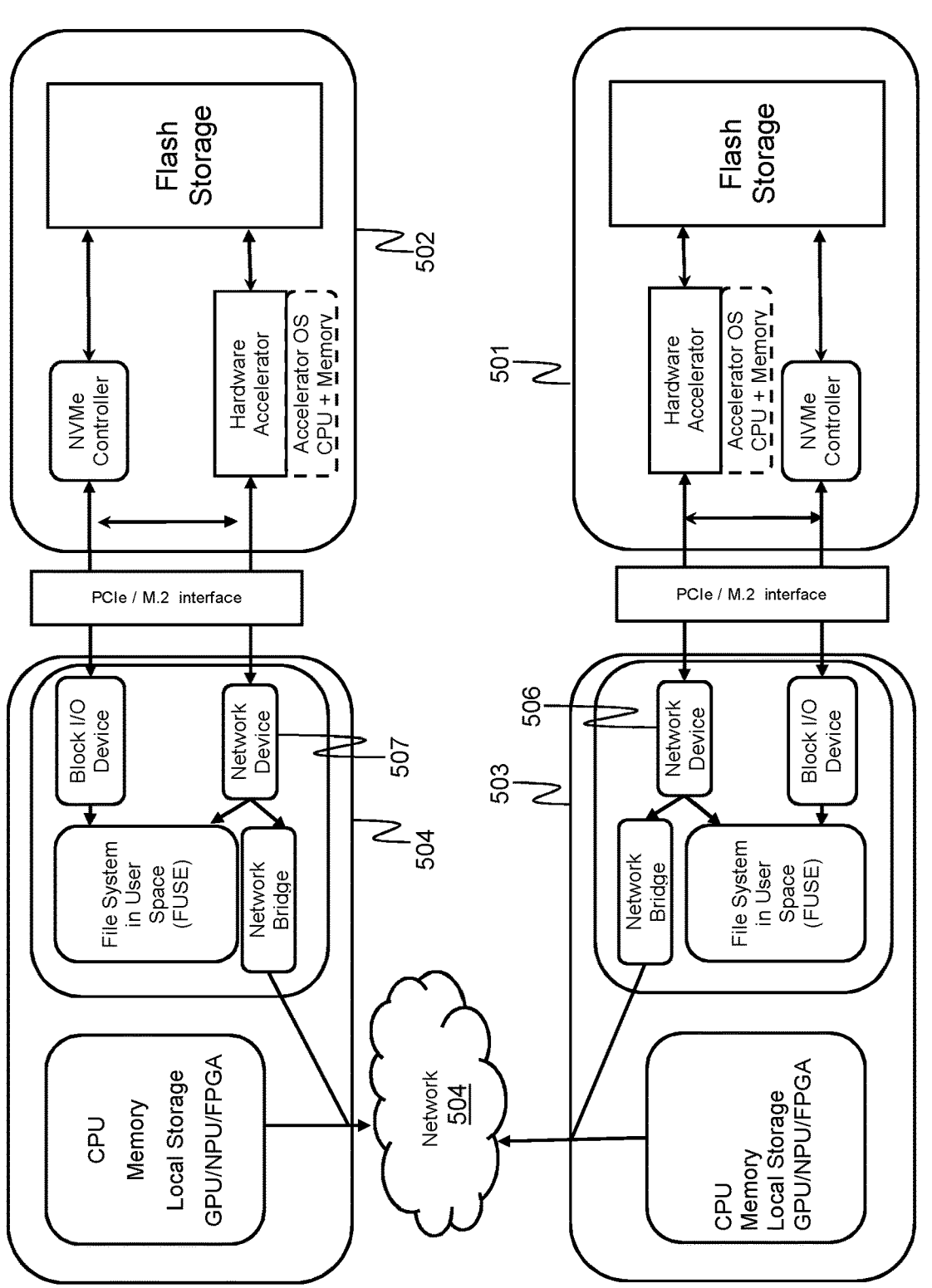
FIG. 5 is a block diagram showing improved storage devices communicating over a network through connected computer systems.

FIG. 5 is a block diagram showing improved storage devices communicating over a network through connected computer systems. In the implementation shown a first improved storage device 501 is connected to a first computer system 503 through a. The first computer system 503 is communicatively coupled to a second computer system 504 over a network 505. A second improved storage device 502 is connected to the second computer system 504 through a hardware interface. The first improved storage device 501 emulates a standard network interface 506 on the first computer system 503 allowing the first improved storage device 501 to send and/or receive data with the second computer system 504 over the network 505. Additionally, the second improved storage device 502 emulates a standard network interface 507 allowing for the second computer system 504 to send and/or receive data to the second improved storage device 503 with the emulated standard network interface. The first computer system 503 may send and/or receive data from the second improved storage device 502. This configuration may allow remote computer systems to access and/or modify files on the improved storage device. For example, a user of the second computer system may create a file filter and upload that filter their improved storage device. The improved storage device may have a privilege system allowing the users to select who may write, read, or modify files on the improved storage device. The user of the first computer system may have privileges set to allow other computer systems to read their filter files on the improved storage device. Thus, the first user may access the second improved storage device and download the first user's filter without accessing the file system of the second user's computer system. In another example the improved storage device may allow coordination of multiple improved storage devices to provide increased computation power on computation task. In this implementation the second computer system may set privileges on the second improved storage device to allow the first computer system to read, write and modify files on the second improved storage device. The first computer system may send a portion of data to the second improved storage device and the first storage device with a request to perform computational operations on the respective portions of data. In response the first and second improved storage devices may carry out the requests and send the results back to first computer system where the portions of resulting data may be assembled. In some implementations the emulated standard network interface may appear to the operating system of the computer system like a wireless or wired networking interface, or a network attached storage device and as such may be compatible with the computer systems native networking system and may be controlled by standard computer networking mechanisms. For example and without limitation, network firewall rules could be defined that restrict access so that the improved storage device can only communicate to the internet and does not have access to the files system of the computer thus providing isolation. In some other implementations network access to the improved storage device may be controlled by network components such (for example and without limitation a network switch) or by the improved storage device itself. The improved storage device may provide virtual interface where users may set network access rules and/or user privileges.

Figure 6:
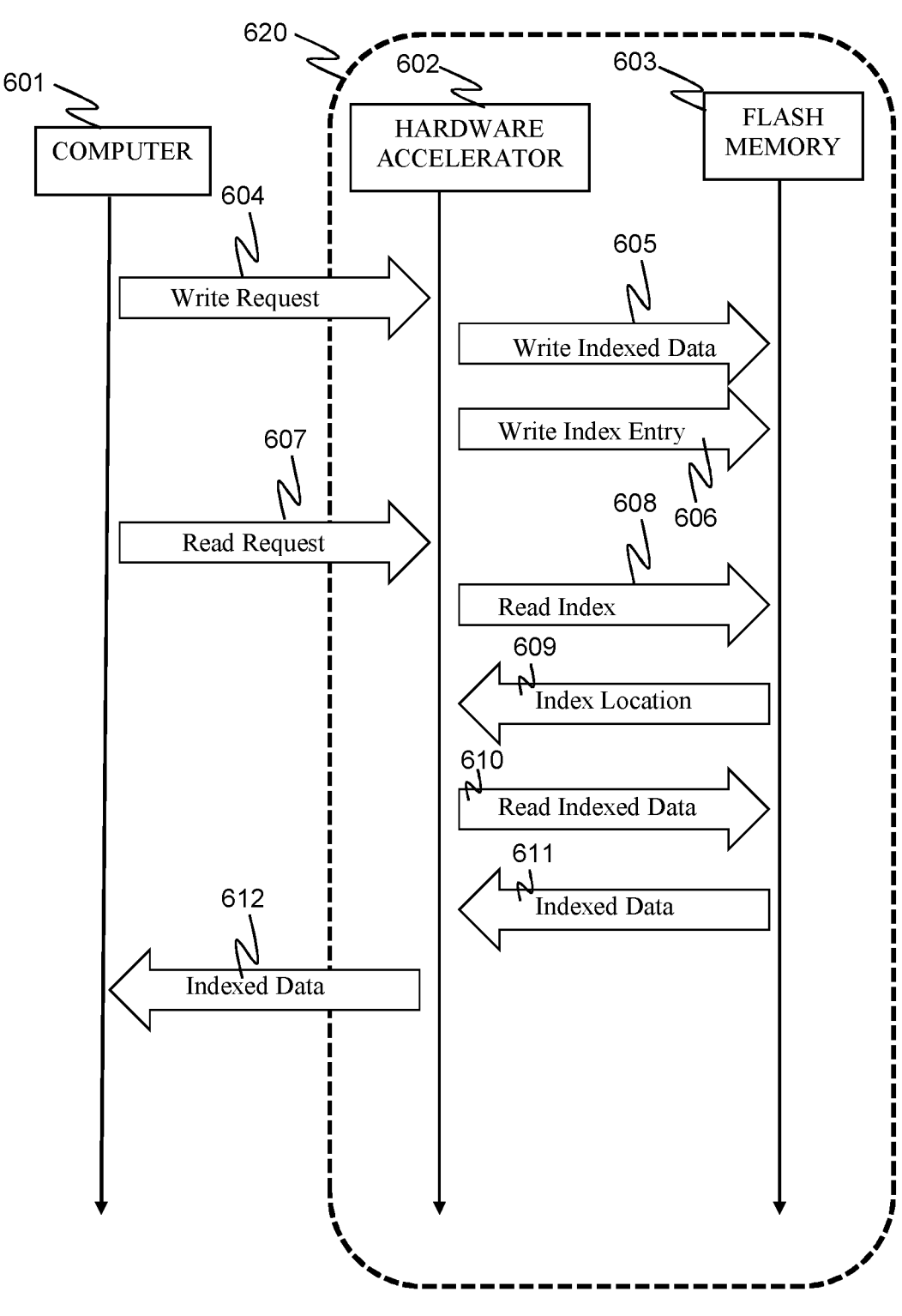
FIG. 6 is a timing diagram for the operation of the improved storage device with a hardware accelerator according to aspects of the present disclosure.

FIG. 6 is a timing diagram illustrating operation of the improved storage device with a hardware accelerator according to aspects of the present disclosure. As shown computer system 601 is in communication with the improved storage device 620. The computer system 601 may send a request to store data 604 to the hardware accelerator 602. This request may be relayed through a storage controller to the hardware accelerator. In an example implementation according to aspects of the present disclosure accelerated reads may be sent through an emulated network interface on the hardware accelerator that presents memory like a Network Attached Storage. In this implementations write requests to the improved storage device may be performed through the Block I/O interface of the storage controller which will represent storage as a system filesystem. Additionally Read and Writes both may occur thru the block I/O interface but reads may not be accelerated due to the low level nature of the storage controller block I/O interface.

According to another aspect of the present disclosure the improved storage controller may include an System on a Chip (SoC) that includes a CPU that may run links and may be configured to view data on the flash storage as a native file system for or the SoC. Thus, the hardware accelerator and SoC may "mount" the flash memory as an attached storage drive to the SoC, then Accelerated reads coming from the network interface may perform special file operations at the filesystem level and is not limited to reads and writes at the raw memory block level. As such the improved storage device may be referred as file aware as the SoC enables filesystem level operations on data stored in the flash memory. Additionally, any specialized data format may still reside on an EXT5/ZFS/NTFS low level format provided through the storage controller data interface. The SoC can read the file like an attached drive then process the data from a raw memory perspective using the filesystem as a guide to the raw data. The file system on the improved storage device may be augmented with Index data so when the SoC opens a file, it may the index so that it would not be required to scan the entire flash memory to determine where the actual data blocks reside, e.g., after the directory/node traversing occurs. In some implementations the index may not be needed to support the customized data format, but it may be used to "cache" the file storage layout allowing the hardware accelerator to assign cores to memory ranges. In some implementations an incoming read request to the hardware accelerator may use the filename and the hardware accelerator may locate an index informing the hardware accelerator on memory segments containing the desired file then the hardware accelerator may return the results to the file read request after the location in the flash memory of the desired file has been scanned by the hardware accelerator. The O/S on the SoC may allow the device to have native support for filesystems or used standard libraries (for example and without limitation Java parquet file reader).

The hardware accelerator 602 may read the data and organize the data according to an index. For example, in the case of data corresponding to textures of different LOD, each index may correspond to a different LOD. The hardware accelerator may then send a write command 605 to the flash storage 603 according to the index. In some implementations the write command 605 may be relayed through the storage controller. Additionally, in this implementation, the hardware accelerator 602 also sends a write request for an entry into an index 606 for the data stored in the flash memory 603.

In some implementations the indexing of data may be file and/or data type selective. In such implementations the hardware controller may read the data or metadata to determine the file type and/or data type of the data and send indexed data store requests based on the determined file type and/or data type. To perform indexing of data, in some implementations the hardware accelerator may keep an internal register representation of indexes stored in the flash memory. Alternatively, the hardware accelerator may read the index from the flash memory before organizing the data according to the index.

The computer system 601 may request to read data 607 from the improved storage device 602. This read request 607 may pass to the hardware accelerator 602. In some implementations the read request may be initially received by the storage controller before passing to the hardware accelerator 602. After receiving the read request, the hardware accelerator may selectively send a read request for the indexed data corresponding to the index for the data to be read 608 to the flash memory 603. Selectively sending the read request may include reading the data to determine whether the file type and/or data type of the data to be read is stored with an index or, if there are multiple indices for different data types or file types, which index should be read to determine the location of the data to be read. The flash memory 603 sends the index data including the index location 609 for the data, to be read, back to hardware accelerator 602. The hardware accelerator 602 then uses the index location to send a read request 610 to the flash memory 603 for the data at the location indicated by the index. In response the flash memory 603 may send the requested indexed data 611 back to the hardware accelerator. Alternatively, the flash memory 603 may send the requested indexed data to the storage controller instead. Once received at the hardware accelerator 602 or storage controller the data may be sent 612 to the computer system 601.

Figure 7:
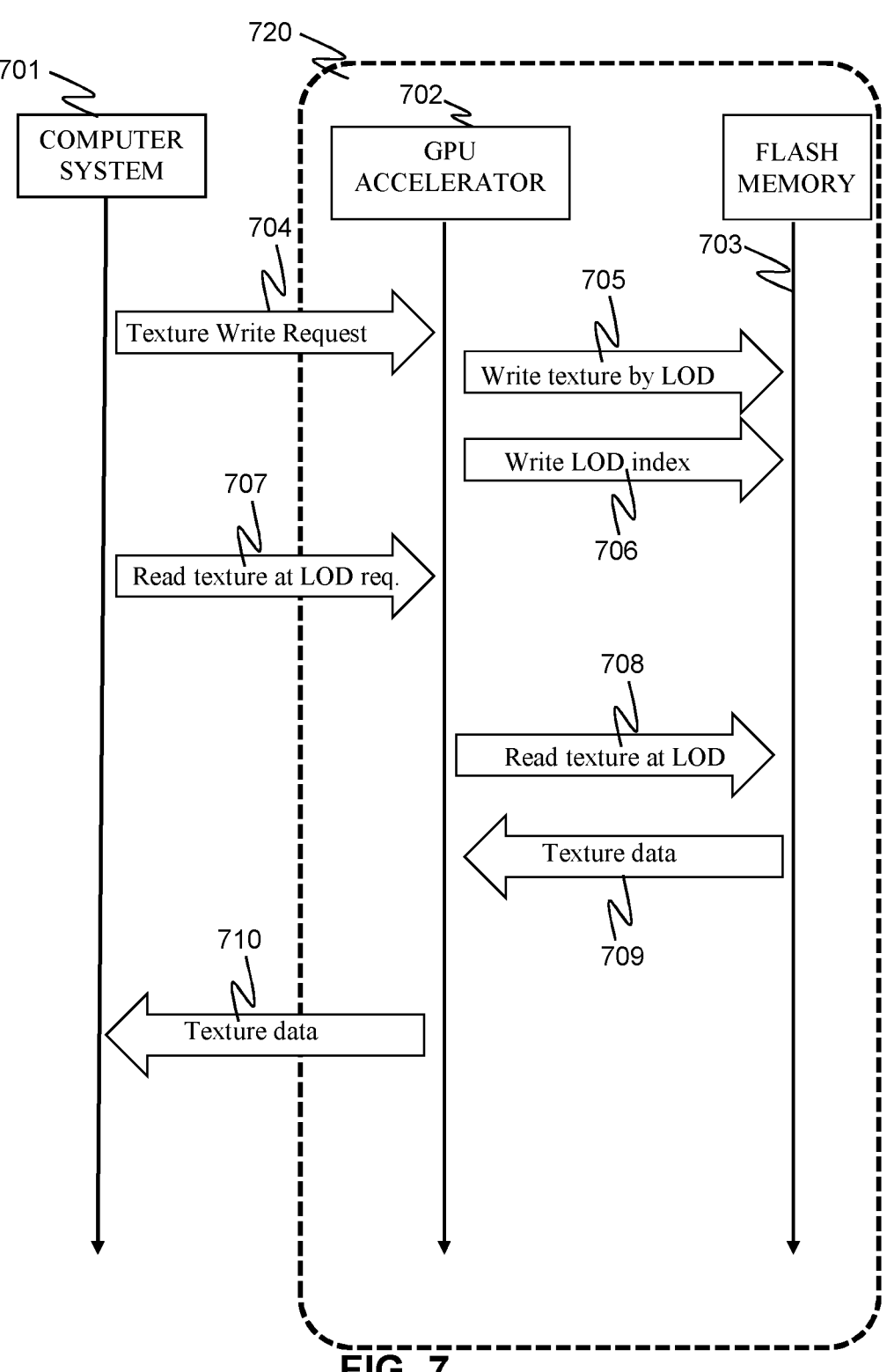
FIG. 7 is a timing diagram for the operation of the improved storage device with a GPU accelerator according to aspects of the present disclosure.

FIG. 7 is a timing diagram for the operation of the improved storage device with a GPU accelerator according to aspects of the present disclosure. As shown a computer system 701 is in communication with the improved storage device 720. The computer system 701 may send a request to store texture data 704 to the GPU accelerator 702 this request may be relayed through a storage controller to the GPU accelerator. The GPU accelerator 702 may read the texture data and organize the texture data according to a Level of Detail (LOD). The GPU accelerator may then send a write command for the texture data 705 to the flash storage 703 according to the LOD. In some implementations the write command 705 may be relayed through the storage controller. Additionally, in this implementation, the GPU accelerator 702 also sends a write request for an entry into an LOD index 706 for the texture data stored in the flash memory 703. To perform indexing of texture data by LOD, in some implementations the hardware accelerator may keep an internal register representation of LOD indexes stored in the flash memory. Alternatively, the hardware accelerator may read the LOD index from the flash memory before organizing the data according to LOD.

The computer system 701 may request to read texture data at a specific LOD 707 from the improved storage device 702. This read request 707 may pass to the GPU accelerator 702. In some implementations the read request may be initially received by the storage controller before passing to the GPU accelerator 702. After receiving the read request, the GPU accelerator may selectively send a read request for the texture data indexed by LOD 708 to the flash memory 703. In some implementations the GPU accelerator may examine the request to determine if the request is for texture data. The flash memory 703 sends the texture data 709, back to GPU accelerator 702. Alternatively, the flash memory may send the requested texture data to the storage controller instead. Once received at the GPU accelerator 703 or storage controller the data may be sent 710 to the computer system 701.

Figure 8:
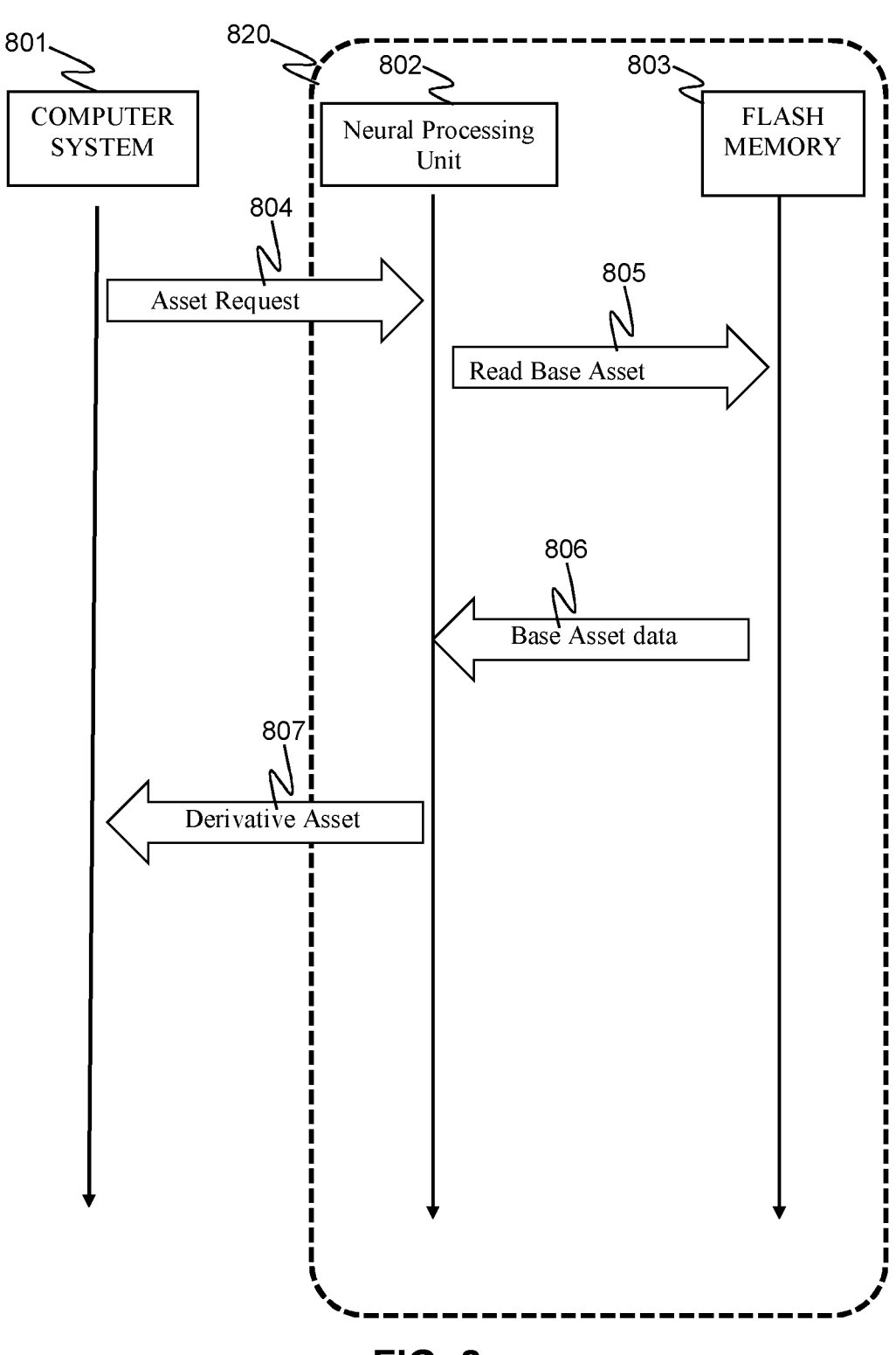
FIG. 8 is a timing diagram for the operation of the improved storage device with a NPU according to aspects of the present disclosure.

FIG. 8 is a timing diagram for the operation of the improved storage device with a NPU according to aspects of the present disclosure. In this implementation, the NPU generates implements a machine learning model trained with a machine learning algorithm to generate a derivative asset. A computer system 801 is communicatively coupled with the improved storage device 820. The computer system 801 may send a request for an asset to the NPU 802. The computer system 801 may already be configured with sufficient programming to support receiving assets derivative of the requested asset from the NPU. In some implementations the computer system may make requests for assets from the NPU when a consistency in the appearance of the asset is not necessary. For example and without limitation, in the context of a video game the computer system may requests assets from the NPU for background assets which may not frequently be inspected by the user.

The NPU 802 may receive the request for an asset 804 and initiate the required NN models to generate a derivative asset from the requested asset. Alternatively, the NPU 802 may be pre-configured to generate a derivative asset from the base asset. In either case the NPU 802 sends a request 805 to the flash memory 803 for the base asset. The flash memory 803 then sends the base asset 806 to the NPU 802.

After reception of the base asset the NPU 802 generates a derivative asset using the trained machine learning model. Once the derivative asset has been generated the NPU 802 sends the derivative asset 807 to the computer system 801.

In other alternative implementations the base asset may be (or may include) a text description of an image and the neural network may generate a derivative in the form of one or more images derived from the text description. In yet other alternative implementations the base asset may be (or may include) a text description of a digital object and the neural processor may generate a derivative asset in the form of a digital representation of the object in three dimensions from the text description. In yet other alternative implementations the base asset may be (or may include) an image of a digital object and the neural processor may generate a derivative asset in the form of a three dimensional representation of the image of the digital object from the image of the digital object. In still other implementations, the flash memory may contain a script file including instructions for generation of the derivative asset and the neural processor may use the script file to generate the derivative asset from the base asset.

According to aspects of the present disclosure, an NPU may implement Machine Learning models to generate derivative assets of base assets stored in memory. An example of machine learning model that may be trained to generate a derivative asset from a base asset is a diffusion model. A diffusion model trains a neural network to predict an image based on a distribution of noise. Initially a diffusion model is trained to remove noise that is added to a clean image once fully trained the model is tasked with generating an image from random noise. For more information about diffusion models see: Yang, Ling "Diffusion Models: A Comprehensive Survey of Methods and Applications" ArXiv, 2209.00796, Published: Sep. 2, 2022, Available at: https://arxiv.org/abs/2209.00796 the contents of which is incorporated herein by reference. Another generative model is an autoencoder. An autoencoder is a type of neural network layout having encoder networks which take part in dimensional reduction outputting embeddings and decoder networks which predict a synthetic output using the embeddings. The auto-encoder neural network outputs feature length embeddings and the decoder includes a neural network that uses those feature length image embeddings to generate one or more synthetic assets for more information on Autoencoder asset generation see: Huiwen, Chang "Muse: Text-To-Image Generation via Masked Generative Transformers" ArXiv, arXiv: 2301.00704 Published: Jan. 2, 2023, Available at: https://arxiv.org/abs/2301.00704 the contents of which is incorporated herein by reference. Yet another generation method is Neural Radiance fields which generate a three-dimensional representation of multiple image views, more information about NeRFs can be found at: Mildenhall, Ben, "NeRF: Representing Scenes as Neural Radiance Fields for View Synthesis" ArXiv, arXiv: 2003.08934, Published: Mar. 19, 2020 Available at: https://arxiv.org/abs/2003.08934 the contents of which are incorporate herein by reference.

As may be appreciated from the preceding discussion, a storage device may improve the function of a connected computer system with the addition of a hardware accelerator which at least selective indexes data stored in flash memory and may selectively retrieve data stored in the flash memory reducing the amount of data that needs to be read and/or retrieved from the flash memory by the computer system. Additionally, an improved storage device having an NPU may be generated multiple different derivative assets with a generative machine learning model implemented by the NPU. Thus reducing the amount of data the computer system needs to store and/or retrieve from the flash memory to generate different assets because a single base asset may be used to generate multiple different assets.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A storage device, comprising;
   a storage controller;
   a flash memory communicatively coupled to the storage controller; and
   a hardware accelerator communicatively coupled to the flash memory and the storage controller wherein the hardware accelerator is configured to:
   generate, after receiving data, a token representing the data and indicating a level of detail of the data;
   store the data in the flash memory at an indexed position based on the token; and
   selectively retrieve the data stored in the flash memory in response to a request for the data and based on the token.

2. The storage device of claim 1, wherein the storage controller, the flash memory, and the hardware accelerator are located on a same circuit board.

3. The storage device of claim 1, further comprising a physical interface communicatively coupled to the storage controller and the hardware accelerator.

4. The storage device of claim 3, wherein the physical interface is an M.2 connector.

5. The storage device of claim 3, wherein the physical interface is a Universal Serial Bus connector.

6. The storage device of claim 3, wherein the request for the data is received from a computer system communicatively coupled to the storage device through the physical interface.

7. The storage device of claim 3, wherein the request for the data is received by the storage controller and the storage controller communicates the request to the hardware accelerator.

8. The storage device of claim 1, wherein the hardware accelerator is a graphics processing unit accelerator and wherein the data are textures, wherein the graphics processing unit accelerator is configured to retrieve the data using with an index, wherein the textures are stored in the flash memory indexed by the token.

9. The storage device of claim 8, wherein the graphics processing unit accelerator further includes at least one of a hardware video decoder module and a hardware video encoder module.

10. The storage device of claim 8, wherein the graphics processing unit accelerator further includes a hardware graphics processing pipeline stage.

11. The storage device of claim 1, wherein the hardware accelerator is a field programmable gate array.

12. The storage device of claim 1, wherein the storage controller is an NVME controller or a USB controller.

13. The storage device of claim 1, wherein the hardware accelerator is further configured to store the data in the flash memory using an index in response to a storage request for the data.

14. The storage device of claim 13, wherein the hardware accelerator is further configured to generate an index entry in the flash memory for the data stored in the flash memory.

15. The storage device of claim 1, wherein the hardware accelerator selectively retrieves data stored in the flash memory using an index based on a file type of the data.

16. The storage device of claim 1, wherein the hardware accelerator is further configured to compress the data.

17. The storage device of claim 1, wherein the hardware accelerator is communicatively coupled to a second hardware accelerator over a network through at least a first computer system.

18. The storage device of claim 17, wherein the hardware accelerator is further configured to send the data to the second hardware accelerator over the network.

19. A storage device, comprising;

a storage controller;

a flash memory communicatively coupled to the storage controller; and a hardware accelerator communicatively coupled to the flash memory and the storage controller wherein the hardware accelerator is configured to:

generate, after receiving data, a token representing the data;

compress the data;

store the data in the flash memory at an indexed position based on the token; and selectively retrieve the data stored in the flash memory in response to a request for the data and based on the token.

20. A storage device, comprising;

a storage controller;

a flash memory communicatively coupled to the storage controller; and a hardware accelerator communicatively coupled to the flash memory and the storage controller wherein the hardware accelerator is configured to:

generate, after receiving data, a token representing the data;

store the data in the flash memory at an indexed position based on the token, wherein the data is represented using a vector oriented data format;

perform a search through the data in the vector oriented data format; and selectively retrieve the data stored in the flash memory in response to a request for the data and based on the token.

* * * * *